United States Patent [19]
Ludlow et al.

[11] 3,753,092
[45] Aug. 14, 1973

[54] LIQUID TESTING DEVICE FOR MEASURING CHANGES IN DIELECTRIC PROPERTIES

[75] Inventors: Thomas B. Ludlow, St. Paul; Keith S. Champlin, Minneapolis, both of Minn.

[73] Assignee: Johanna Plastics, Inc., St. Paul, Minn.

[22] Filed: Apr. 8, 1971

[21] Appl. No.: 132,299

[52] U.S. Cl. .............................................. 324/61 R
[51] Int. Cl. ............................................. G01r 27/26
[58] Field of Search ..................... 324/61, 60, 57; 317/246; 73/64

[56] References Cited
UNITED STATES PATENTS

| | | | |
|---|---|---|---|
| 3,331,019 | 7/1967 | Irwin | 324/61 P |
| 3,182,255 | 5/1965 | Hopkins et al. | 324/61 R |
| 2,219,497 | 10/1940 | Stevens et al. | 324/61 P |
| 3,271,669 | 9/1966 | Lode | 324/60 |
| 3,300,720 | 12/1967 | Mennie | 324/57 |

*Primary Examiner*—Alfred E. Smith
*Attorney*—Schroeder, Siegfried & Ryan

[57] ABSTRACT

A self-contained apparatus for measuring small changes in the permittivity or dielectric constant of an insulating liquid such as, e.g., lubricating oil. A few drops of said liquid are placed in an open-type test cell possessing two coplanar electrodes imbedded in a low permittivity, insulating material forming its bottom surface. The electrode configuration is designed such that the electrical capacitance between electrodes is strongly dependent upon the permittivity of the liquid but is virtually independent of the quantity of liquid in the test cell.

The electrodes are connected to a comparison circuit which is designed to be optimally sensitive to small changes in electrical capacitance. The comparison circuit contains a variable capacitor for balancing the capacitance of the test cell and a null meter for detecting this balance condition. The dial scale attached to the variable capacitor is initially set to zero by balancing the instrument with a standard liquid in the test cell. Measurements on sample liquids thereafter yield readings proportional to the deviation of the permittivity of the sample liquid from that of the standard liquid. In testing the quality of a lubricating oil, unused oil is employed as a standard liquid and the permittivity deviation is directly related to the amount of oxidation and other contamination present in the oil sample.

16 Claims, 14 Drawing Figures

INVENTOR.
Thomas B. Ludlow
Keith S. Champlin
BY Schroeder Siegfried & Ryan
ATTORNEYS

LIQUID TESTING DEVICE FOR MEASURING CHANGES IN DIELECTRIC PROPERTIES

Our invention relates to apparatus for accurately measuring small changes in the permittivity (i.e., dielectric constant) of insulating liquids such as, e.g., lubricating oils.

Organic liquids such as lubricating oils, hydraulic fluids, gasoline, greases, cooking oils, and similar substances vary in chemical composition after exposure to heat, shear force, combustion gases, aging and contamination to alter their general chemical composition through oxidation and the introduction of contaminants thereto. As a consequence, their electrical permittivity or dielectric constant changes. Apparatus and methods for determining the condition of such substances are known and in use. However, most of such apparatus and methods employed are directed to laboratory type equipment which is complex, expensive, non-portable, and inapplicable to measurements made in the field by non-skilled technicians. In particular, the measurement of the lubricating properties of lubricating oils used in internal combustion engines at sites, such as garages and gasoline filling stations, has heretofore been impractical. During the useful operating life of a lubricating oil, its relative permittivity increases by about five percent from the nominal value of about 2.17. Existing apparatus has been employed to measure the electrical conductivity or the permittivity of lubricating oils; however, accuracy and consistency in measurement has not been available. Further, a simplified testing device which may be readily used by non-skilled personnel in the field to determine rapidly and accurately the condition of the oil has not been practical.

The present invention is directed to an improved liquid testing device that accurately measures very small changes in the electrical permittivity of an insulating liquid and is capable of usage by the average personnel employed at measurement sites such as garages and filling stations. The improved tester is a portable unit into which a few drops of liquid are placed and a measurement of the deviation of its permittivity from that of a standard sample is obtained therefrom through simple operation of the instrument. An important feature of the device is that the measurements are not affected by the quantity of liquid tested as long as said quantity is more than a certain minimum amount. The improved instrument employs a novel L-C comparison circuit of high sensitivity excited by an rf generator source receiving power from a self-contained battery. The improved open-type test cell design is easy to clean and provides optimum accuracy and repeatability to the measurements.

It is therefore the principal object of this invention to provide a simplified device for accurately measuring very small changes in the permittivity of an insulating liquid such as, e.g., lubricating oil.

Another object of this invention is to provide in a device of this type, a simplified measurement procedure in which one merely adjusts a single dial to obtain a null indication; the number thus obtained from the dial scale being directly proportional to the deviation of the permittivity of the test liquid from that of a standard sample.

A further object of this invention is to provide in a device of this type, electrical means for initially adjusting both the zero point of the deviation dial scale and the scale factor or proportionality constant of the deviation dial scale.

Another object of this invention is to provide in a device of this type, an open-type test cell that is easy to clean and whose electrical capacitance is strongly dependent upon the permittivity of the liquid contained in the cell but is virtually independent of the quantity of that liquid as long as said quantity is more than a certain minimum amount.

A further object of this invention is to provide in a device of this type, a simplified arrangement of parts and materials which makes the device relatively insensitive to variations in temperature of the liquid being tested.

Another object of this invention is to provide in a device of this type, an improved comparison circuit in which an L-C network containing the test cell as its capacitive element and an L-C network containing a variable capacitance are coupled together with diodes having conduction angles of nearly 360°; said diodes providing simple means for detecting the condition of having the latter network tuned to the same frequency of resonance as the former.

A further object of this invention is to provide in a device of this type, maximum sensitivity to very small changes in cell capacitance by initially adjusting the inductance of the L-C network containing the test cell as its capacitive element so as to produce a condition of series resonance at the operating frequency with the nominal value of cell capacitance.

A further object of this invention is to provide a simplified liquid testing device of this type which can be operated by unskilled personnel and which is easy to use and maintain.

These and other objects of this invention will become apparent from a reading of the attached description together with the drawings wherein.

Permittivity, or "dielectric constant" as it is sometimes called, is an electrical property of any insulating material and is defined as the ratio of the electric flux density in the material to the electric field intensity in the material. It is frequently measured in relative units by comparing the above stated ratio to the corresponding ratio in vacuum. The relative permittivity of most materials is a well defined number greater than unity.

The relative permittivity of refined oils commonly used to lubricate internal combustion engines is nominally about 2.17 when the oil is in its virgin state. Slight deviations from this figure are found due to the introduction of additives. Such additives account for less than one percent variation, however. On the other hand, as the oil becomes oxidized through use, its relative permittivity increases quite markedly. We have found for example, that oxidation in sufficient quantity to degrade the lubricating properties to the point where the oil is no longer suitable is associated with about a five percent increase in permittivity. Furthermore, the presence of many other harmful contaminants will increase the oil's permittivity as well. For example, trace amounts of ethylene glycol have a large effect on the permittivity of lubricating oil because the relative permittivity of ethylene glycol is about 70 compared with 2.17 for oil. Ethylene glycol is used in radiator antifreeze and is a common and dangerous contaminant of engine oil.

The invention described in this disclosure is a self-contained device for precisely measuring small changes in the permittivity of an insulating liquid. As such, it is ideally suited to field testing engine oils for the purpose of determining their lubricating qualities. It is not our intention to restrict the device to this use, however. For example, the device could also be used to test cooking oil to determine its degree of rancidity or to test gasoline to determine its purity. All such uses are intended to be included in the scope of this invention.

In testing an insulating liquid, a few drops of said liquid are placed in an improved test cell of novel design and construction. The test cell is open at the top with two electrodes imbedded in an insulating substrate of low permittivity at the bottom of the cell. The surfaces of the electrodes are flush with the surface of the substrate to prevent the collection of contaminants between electrodes and to permit easy cleaning of the cell. The fringing fields between electrodes extend up into the liquid sample through the electrode-liquid interface. Because of the very small electrode width and the very narrow gap between electrodes, however, the fringing fields decay rapidly with height. Thus, the electrical capacitance of the cell measured between electrodes is virtually independent of the height of the liquid as long as said height is greater than a certain minimum value. Further design features of the test cell described below insure that the electrical capacitance between electrodes is optimally sensitive to variations in the permittivity of the sample liquid.

Figure 1:
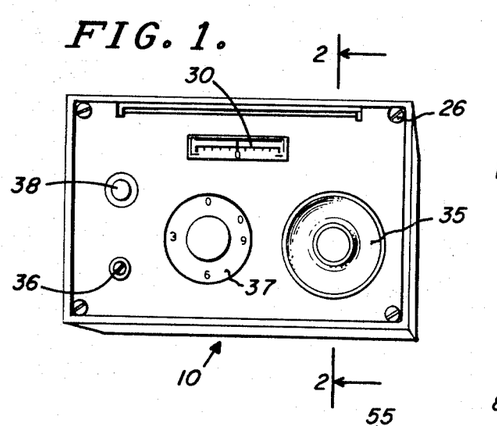
FIG. 1 is a perspective view from the top of the improved liquid testing device.
Figure 2:
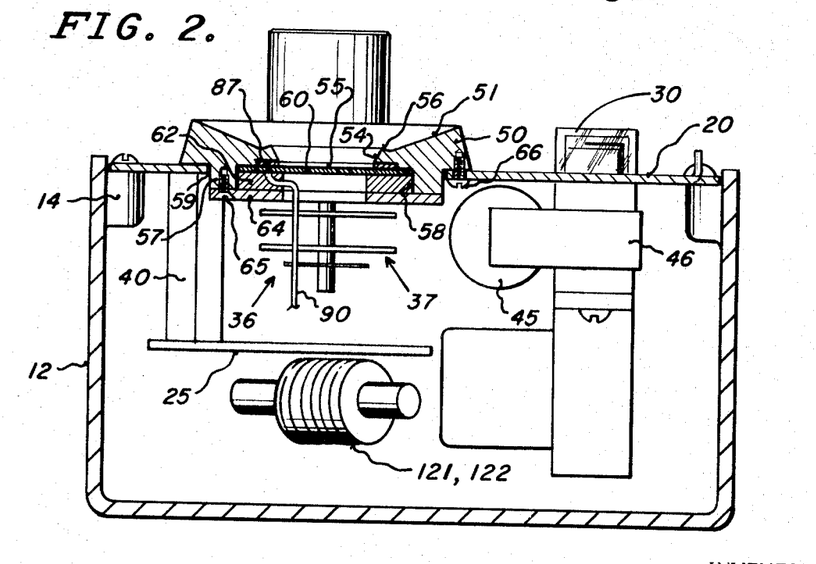
FIG. 2 is a sectional view of the liquid testing device of FIG. 1 taken along the line 2—2 therein and enlarged.

Our improved design of the liquid testing device is shown in the drawings generally at 10 as a self-contained portable unit. The testing device incorporates a case or housing 12 which is open at one surface and includes a plurality of mounting flanges 14 adjacent the same. The case or housing may be made of any material, and we have found that a metal or molded plastic housing is suitable for this purpose. The open face of the housing mounts an instrument plate 20 made of a metallic material which is adapted to mount the components of the testing device or the majority of the same on the under and upper surfaces of the instrument plate and in part on a suitable mounting panel, indicated at 25 attached thereto. As will be seen in FIGS. 1 and 2, the face plate 20 is positioned in the open side of the casing to rest on the flange members 14 thereof and to be suitably secured thereto through means, such as screws 26, to position the same in the open face of the casing and close the casing. The face plate, as will be hereinafter noted, serves as a ground or return path for the electrical circuit of the testing device and mounts the indicating meter or null detector, indicated generally at 30, and a test cell, indicated generally at 35, for measuring the permittivity of the oil or liquid. In addition, variable calibrating capacitances (not shown) are mounted on the board and their adjusting knobs or shafts 36, 37 extend through the panel and are positioned on the face of the plate. Also mounted on the instrument plate is a momentary contact switch or pushbutton switch 38 whose button appears on the face of the panel. The button must be depressed to maintain the switch contacts closed and as will be hereinafter noted initiates and controls the application of power from the battery to the tester circuit. In addition to the capacitances, switch, and meter, a circuit board 25 is connected to the plate 20 and mounts the remaining components of the circuit to be hereinafter identified. The circuit board is spaced from the face plate 20 through spacer members 40. Included in the structure beneath the face plate is the battery 45 with suitable mounting clip 46 to position the same on the board with connections to the switch and circuit to energize the same.

Figure 3:
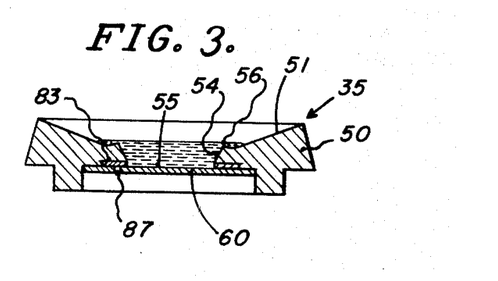
FIG. 3 is a sectional view of the test cell showing an optimum liquid level therein for test purposes.

The test cell 35 will best be seen in its construction from the sectional view in FIG. 3. It includes an annular or cup-shaped structure 50 having an inward conical surface 51 defining an outer cup with an inner recessed or cup-shaped portion 54 surrounding the electrode portion 55 of the cell, the inner cup-shaped portion having also an inner conical surface at a larger angle than the outer surface as will be hereinafter defined. The inner cup-shaped structure, extends slightly above the outer inclined surface, as at 56, to define an annular ridge or lip with the angle of inclination or taper of the inner cup being approximately 60° to the horizontal and with the outer portion being approximately 20° to the horizontal. This cup-shaped structure is preferably made of aluminum or other metal and has a downwardly depending annular flange 57 defining a mounting shoulder 59 and an inner cylindrical recess 58. The recess 58 defines an area in which the electrode structure 55 is positioned, the electrode structure being mounted on a suitable backing material or board 60. A suitable backing ring, as indicated at 62, is positioned behind the backing board 60 and the entire structure is positioned within the recess by means of a locking or retaining ring 64 which is suitably connected to the cup-shaped structure 50 by means of screws 65. The cup-shaped structure is positioned through an aperture in the face plate 20 at the shoulder 59 and is secured to the plate 20 by suitable screws 66 which extend through apertures in the face plate and clamp the cell with the cup-shaped structure surrounding the same onto the face plate 20 of the instrument or device.

Figures 5, 6, 7, 8, 9:
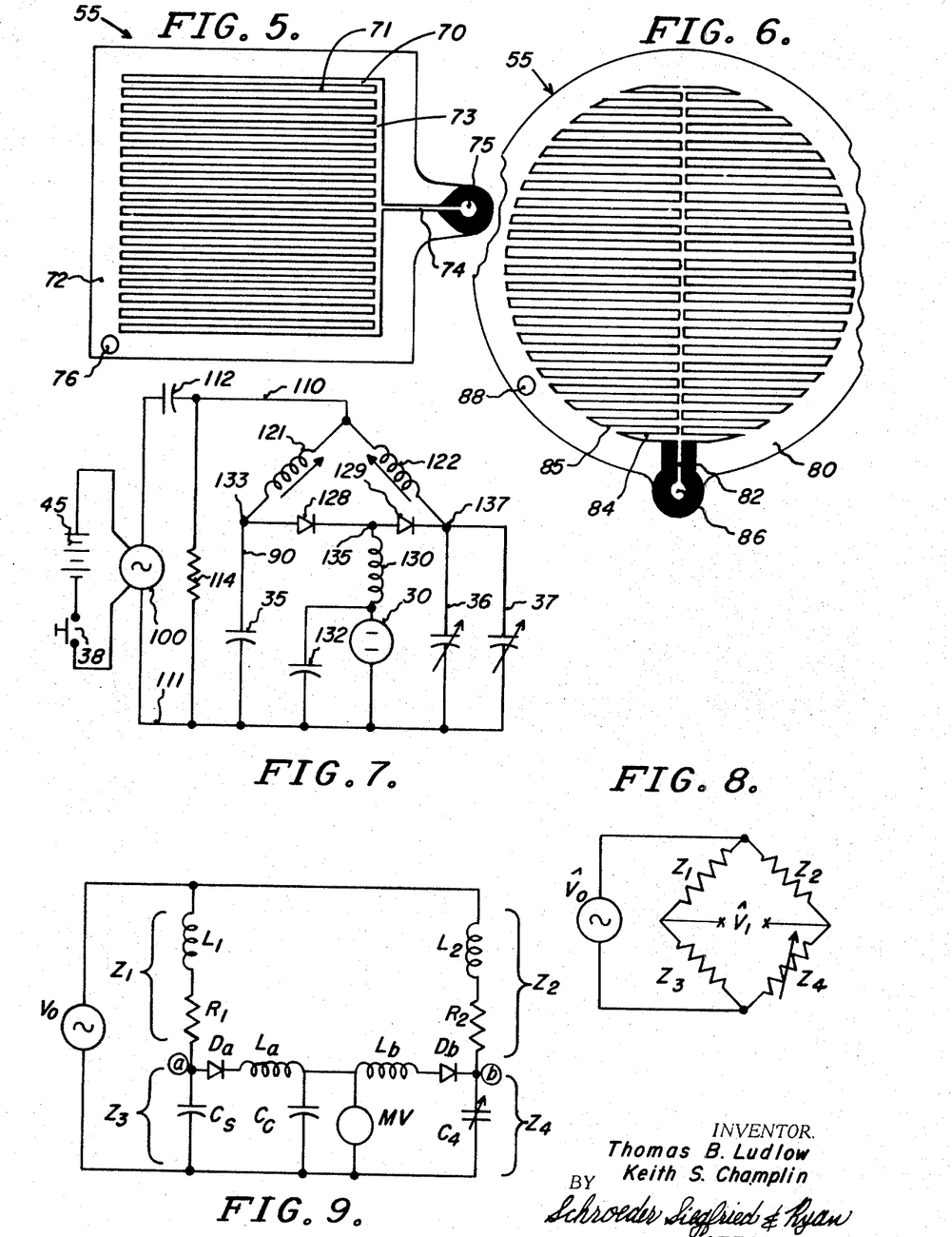
FIG. 5 is an enlarged plan view of a portion of the test cell showing the preferred electrode embodiment of the same.
FIG. 6 is an enlarged plan view of an alternate embodiment of the test cell showing a variation in the electrode construction thereof.
FIG. 7 is a schematic diagram of the comparison circuit employed in the improved liquid testing device.
FIG. 8 is a schematic diagram of a conventional alternating current bridge circuit.
FIG. 9 is a schematic diagram of an ac bridge circuit modified in such a manner as to permit balancing the bridge with a single adjustment.

The details of the electrode configuration for the test cell may vary and two such embodiments or designs are shown in FIGS. 5 and 6. For the sake of simplicity, the white areas indicate metallic conductor surfaces, while the broad black lines indicate gaps between the conductive or electrode surfaces. The relative widths of the electrode fingers and the gaps between them are, carefully controlled, as indicated below. Thus, in FIG. 5, a square sensing surface is shown which is formed by a plurality of interlaced or interspaced parallel fingers 70, 71 which are connected respectively to a common conductor or surface indicated generally at 72 and 73. The conductors 70, for example, emanate from the common conductor 73 with a lead conductor 74 leading to a connector portion 75. The remaining conducting surface 72 has a connector portion 76 and the conductors 71 are spaced parallel between the conductors 70 and are connected in common with the remaining conductor surface 72.

The configuration in FIG. 6 has a circular sensing surface and utilizes a common sheet of conductor material 80 having an isolated conductor 82 at the center thereof from which a plurality of fingers 84 extend to either side of the same and are spaced or separated by a gap and conductors 85 which are common to the surface 80. The common conductor 82 has an output terminal 86 common thereto and the outer surface has a common terminal 88 common thereto to define the pair of conductive surfaces in the electrode configuration with the same gap extending between the respective conductive surfaces.

We have found that the electrodes may be made of any suitable good conductive material preferably in sheet form. These may be any hard noble metal or preferably, as shown in the drawings, may be made of copper which has been clad to the backing surface 60 suitably etched to form the electrode configuration and finally plated with a hard noble metal, preferably nickel or platinum. In the design of the cell or the electrode construction thereof for the cell which forms the variable capacitance with the oil, it will be noted as in FIG. 4, that flux lines emanating between adjacent fingerlike conductors, such as 70, 71 extend to either side of the same. Thus, the flux lines will pass through the oil and also through a backing material or whatever is behind the conductors. Thus, if the conductors are mounted on a board or backing material, the board or backing material must preferably have a low dielectric constant and also one which does not vary significantly with temperature. The low dielectric constant is desirable to minimize static capacitance of the cell which combines with the variable capacitance associated with the liquid being measured or tested. In connection with oils, and particularly new oils, the deielctric constant at room temperature is about 2.17. This dielectric constant or permittivity increases slightly with temperature to about 100° F. and then decreases. Thus, a backing material having substantially constant permittivity increases reliability of the instrument. We have found that a suitable backing material is polyphenylene oxide (PPO) produced in laminate form under the trade name of TEXTOLITE No. 11711, by the General Electric Company. This laminate will include a copper coating and the suitable electrode design may be etched on the same to define the electrode for the test cell. Other materials which might be used as the backing would include inorganic substrates such as silica, quartz, and various glasses which could be surface impregnated with metallic finger design while maintaining a substantially flush surface of the substrate material between the fingers. In the construction of the preferred embodiment of the test cells, the etching of the copper coating will define gaps between the electrodes which will suitably be filled with a paste of substrate material and flushed to provide a flat or flush surface with an insulating material of the same dielectric constant as that of the backing material between the electrodes. Alternatively, the flushing of the polyphenylene oxide material between the electrodes may be affected by simply hot pressing the electrode surface against a polished platen, in which case some of the polyphenylene oxide backing material simply flows up into the gap between electrodes, under heat and pressure. In the construction of the test cell and for the purpose of retaining the same in the cylindrical wall member or cup-shaped structure 50, a suitable teflon retaining ring 62 has been added which material has a dielectric constant of approximately 2.1 with good temperature stability. Thus it does not appreciably alter the static capacitance of the cell.

Figure 4:
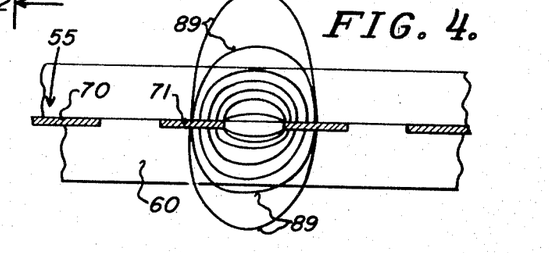
FIG. 4 is a sectional view of a test cell segment showing electric flux lines between adjacent electrodes.

As indicated in FIG. 4, the flux lines 89 arch above and below the conductors 70, 71. If the oil height is too small, a few lines will pass into the air space above the surface of the oil causing the cell capacitance to be somewhat height sensitive. Therefore, a fixed minimum depth of oil is provided by means of the cup-shaped structure 54 surrounding the electrodes as indicated in FIG. 3 which will insure the substantial constant level of oil over the electrodes. An increase in oil above this amount will not affect the capacitance but a minimum level of oil is required to maintain an accuracy in measurement. The depth of the cup-shaped structure and its diametrical dimension together with the overall size of the grid structure forming the electrode is maintained small so that only a small amount of the liquid to be tested is required to determine the quality of the same. This is particularly desirable in connection with the measurement of engine oils wherein the oil is taken from the dip-stick of the engine and drops from the same are placed in the cells for measurement purposes.

As shown in FIG. 3, the inner cylindrical recess 54 in the outer cup-shaped structure 50 is inclined at an angle of approximately 60° and projects slightly above the outer inclined portion to define a fence or ridge 56 for a minimum level for filling the oil in the cell for test purposes. This necessary height of oil is determined by the dimensions of the electrode fingers and the gaps therebetween together with the overall length of the conductors forming the capacitance of the cell. An electrode configuration made of straight parallel and uniform width fingers and gaps is preferred. The ungrounded electrode of the cell, for example, 74 and 82 in the cell configuration shown in FIGS. 5 and 6, is constructed with a minimum area for the collector or common conductor for the electrode. While an exceedingly long gap length between electrodes is not essential, it has been found that the longer the length, the greater the sensitivity of the instrument, and the less critical the depth of oil. The electrodes themselves may be of varying thickness, depending upon the fabrication process, without affecting the sensitivity of the instrument, and the simplified etched design employed herein in FIG. 5 indicates a finger width of approximately 0.004 of an inch and a gap of approximately 0.003 of an inch with a minimum oil height level for the cell, that is the depth of the inner cup, in the order of 0.050 to 0.070 inches. Such a sensor design will function properly with only several drops of oil or liquid for measurement purposes. The remaining portion of the cup structure, as indicated in FIG. 3, is inclined at an angle of approximately 60° to the horizontal or the flush surface of the electrodes to provide a slope to the same over which liquids such as oil will not creep or climb. The 20° slope may vary plus or minus 5° and will insure that an adequate level of oil of uniform depth will exist within the inner recess 54 covering the electrodes of cell 55 for measurement purposes. If the cup is over-filled, the effect on the capacitance measurement is minimal and the angular relationships simplify the cleaning of the instrument.

In the mounting of the electrodes and the substrate 60 supporting the same in the cell, an additional recessed surface 83 is provided into which a teflon washer or gasket 87 is placed to insulate the ungrounded electrode 75, 86 or electrical circuit connection thereto, as indicated by the conductor 90, which connects in the electric circuit to be hereinafter identified. The opposite or ground conductor is actually common to the cup-shaped structure 50 and to the mounting plate 20 which, as hereinafter defined, provides the common ground connection for the electric circuit.

In the design of the electrodes in the preferred embodiment or construction for either of the grid designs in FIGS. 5 and 6, the electrodes or copper plating on the backing board of polyphenylene oxide material define an electrode thickness of from between 0.003 to 0.005 inches. In the design of the electrode configuration of FIG. 5, the repeat length, that is the distance across one electrode bar and gap adjacent the next electrode, is approximately 0.007 of an inch and this electrode construction will define a fence height or depth for the inner recess or wall section 54 of the test cell of approximately 0.050 inches depth. The electrode construction or shape of FIG. 6 has a similar repeat length, that is a distance measured acorss one electrode and gap, of approximately 0.010 inches with a depth of the inner cell of approximately 0.075 inches. Thus the range for a repeat length as to the fence height in the particular cell construction will be approximately 14 to 100 as a ratio of respective dimensions. The gap between the electrodes in each of the configurations is constant and this gap is filled with a low dielectric material, preferably similar to the backing material or a paste of polyphenylene oxide which has a dielectric constant similar to that of the oil being meausred. In the electrode designs, the surface of the electrodes, that is the face of the electrodes and the gap therebetween should be substantially flush. The length of the electrodes may vary for varying grid designs, the gap width and minimum electrode width and thickness is dictated by manufacturing techniques. We have found that with the electrode width and gap width of the cells shown in FIGS. 5 and 6 respectively the gap length for these particular electrode configurations are approximately nine and fifteen inches. The inner cup diameter for the cells using these electrode configurations vary from seven-sixteenths to one-half inch. Thus, the ratio of the gap length to gap width for the cell designs are approximately 3000/1 and 3800/1. The ratio of gap length to cup diameter for the same cells is approximately 20–30/1. The cell designs described above provide structures which require a minimum amount of oil to provide for ease in measurement and a reduction in oil temperature effect on measurement. Similarly they provide an open face cell design for ease in admission of oil thereto and ease in cleaning of the cells after usage.

A schematic diagram of the measuring circuit employed in the invention is shown in FIG. 7. The form of this circuit resembles that of a conventional ac bridge circuit. As will be discussed below, however, the present circuit differs from an ordinary bridge in several important respects. Because of these differences, the present circuit is much easier to operate and considerably more sensitive to very minute changes in the electrical capacitance of the test cell than would be the case with a conventional bridge circuit of equivalent complexity.

The measurement circuit is powered by a battery 45 that is selectively connected to an rf generator 100 by means of push button switch 38. In the present embodiment, a square-wave 5 MHz quartz crystal oscillator is used to excite the circuit although the rf generator may take varying forms. The rf generator is required to deliver about one volt peak voltage at its fundamental frequency into a 25 ohm resistive load and to demonstrate a maximum of about two percent frequency deviation under all conditions of turning, ambiant temperature, and battery voltage encountered in practice. The output of the generator as indicated by conductor 110 and common ground 111 is connected to the measuring circuit through an R-C coupling network composed of series capacitor 112 and shunt resistor 114. The R-C network is used to prevent the dc level of the generator output voltage from being applied to the measuring circuit while still providing a dc return path for the null meter current. Various other embodiments of the coupling network are possible. For example, resistor 114 could be replaced by a choke coil of sufficient inductance or the R-C network could be eliminated entirely by employing transformer coupling between generator and measuring circuit. The output of the coupling network is applied to two series L-C circuits connected in parallel with one another across conductors 111 and 110. One L-C circuit consists of inductance 121 in series with test cell capacitance 35. The other L-C circuit consists of inductance 122 in series with the parallel combination of zero-set capacitor 36 and deviation-scale capacitor 37. As will be described further below, the zero-set capacitor 36 is provided for initial adjustment of the circuit, and the deviation scale capacitor 37 is varied to obtain null reading during measurement of a sample liquid. The two series L-C circuits are actively coupled together by means of the two semiconductor diodes 128 and 129 in series connection. Null meter 30 consisting of a 100-0-100 microammeter is connected between ground 111 and the common point 135 of the two diodes by means of a low-pass filter consisting of series choke coil 130 and shunt capacitor 132. Typical component values are listed below for the present embodiment including test cell 35 specified above.

| | |
|---|---|
| Capacitors | |
| 112,132 | 0.01 microfarad disc ceramic |
| 36 | 3–30 picofarad variable |
| 37 | 0.2–1.0 picofarad variable |
| Resistors | |
| 114 | 1000 ohm ½ watt carbon |
| Inductors | |
| 121 | 56–97 microhenry slug-tuned variable (Q = 25) |
| 122 | 36–49 microhenry slug-tuned variable (Q = 25) |
| 130 | 2.5 millihenry rf choke |
| Diodes | |
| 128,129 | IN914 signal diodes |
| RF Generator | |
| 100 | Vectron model 231-00-006A 5MHz quartz-crystal square-wave oscillator. |
| Battery | |
| 45 | 5.6 volt mercury battery |

In order to best understand the principles of operation of the above described measuring circuit, it is informative to first examine the operation of a conventional ac bridge. FIG. 8 shows an ac bridge consisting of complex impedances $Z_1$, $Z_2$, $Z_3$ and $Z_4$ excited by a sinusoidal voltage equal to the imaginary part of $\hat{V}_o e^{j\omega t}$ where $\omega = 2\pi f$ is the radian frequency. The bridge is "balanced" such that $\hat{V}_1$ equals zero when the voltage divider formed by $Z_1$ and $Z_3$ is equivalent to the voltage divider formed by $Z_2$ and $Z_4$. One can readily show that this balance condition is described by the equation $$Z_4 = Z_2 Z_3 / Z_1 \tag{1}$$

If the circuit of the present invention (FIG. 7) were a conventional ac bridge, inductances 121 and 122 would be identified with impedances $Z_1$ and $Z_2$. These inductances are not ideal elements, however. They therefore possess resistive as well as reactive components. According to equation (1) therefore, one would be required, in general, to adjust both resistive and reactive components of $Z_4$ in order to achieve complete balance. Since the circuit of the present invention employs only one adjustment, its operation is therefore simpler than that of a conventional ac bridge. Furthermore, one generally must resort to amplification to obtain large null sensitivity with a conventional ac bridge. The circuit of the present invention achieves large null sensitivity by means of resonance tuning and does not employ amplification.

In order to remove the necessity for adjusting two elements to obtain balance, one might attempt to modify the conventional ac bridge as shown in FIG. 9. It will be seen, however, that this modified ac bridge is also inferior to the circuit of the present invention. In the circuit of FIG. 9, the impedances $Z_1$ and $Z_3$ again form one arm of the bridge while impedances $Z_2$ and $Z_4$ form the other arm. The two ac voltages at points ⓐ and ⓑ of the two arms are rectified by diodes $D_a$ and $D_b$ and are filtered by choke coils $L_a$ and $L_b$ along with capacitor $C_c$. The resultant two dc voltages subtract from one another across the millivoltmeter $M_v$. One sees, therefore, that a null reading will occur when the *magnitude* or *absolute value* of the ac voltage at point ⓐ is equal to that of the ac voltage at point ⓑ. The balance condition is thus written $$|\hat{V}_{ⓐ}| = |\hat{V}_{ⓑ}| \tag{2}$$

for the circuit of FIG. 9.

Figure 10:
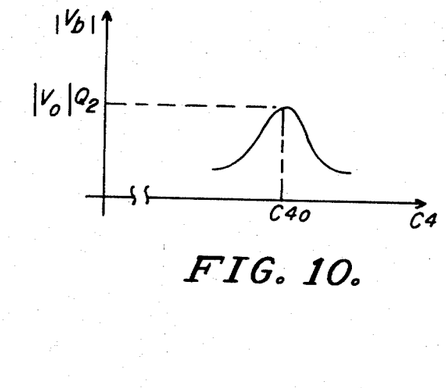
FIG. 10 is a theoretical plot of the magnitude of the ac voltage at point ⓑ in FIG. 9 as a function of the capacitance $C_4$.

The inherent disadvantages to the circuit of FIG. 9 can be understood with reference to FIG. 10. FIG. 9 shows a plot of the ac voltage amplitude $|\hat{V}_{ⓑ}|$ as a function of the value of capacitance $C_4$. A similar plot of $|\hat{V}_{ⓐ}|$ as a function of $C_3$ would, of course, be of identical form. One sees from FIG. 10 that $|\hat{V}_{ⓑ}|$ reaches a maximum value when $C_4$ is equal to the resonance capacitance $C_{40} = 1/\omega^2 L_2$. The maximum value of $|\hat{V}_{ⓑ}|$ is given by $|\hat{V}_0| Q_2$ where $Q_2 = \omega L_2/R_2$ is the quality factor of the inductor in the right arm of the bridge. Since the null meter detects the difference between $|\hat{V}_{ⓐ}|$ and $|\hat{V}_{ⓑ}|$, it is obvious that null cannot be achieved by varying $C_4$ if $|\hat{V}_{ⓑ}|$ cannot become as large as $|\hat{V}_{ⓐ}|$. This would be the case if $C_3$ were nearly equal to its resonance value $C_{30} = 1/\omega^2 L_1$ and $Q_1$ was larger than $Q_2$. If $Q_1$ was less than $Q_2$, null would, in fact, occur for two values of $C_4$. Both nulls would, however, be very insensitive to changes in $C_4$. In order to avoid such ambiguities, it would be necessary to tune the two L-C circuits such that they would both operate far from the resonance condition. Such tuning would lower $\hat{V}_{ⓐ}$ and $\hat{V}_{ⓑ}$ and would thus sacrifice potential null sensitivity.

The measuring circuit embployed in the present invention (FIG. 7) is similar in appearance to the modified bridge circuit of FIG. 9. It avoids the above mentioned disadvantages of the latter circuit, however, by actively coupling the two L-C networks together with semiconductor diodes 128 and 129. This novel refinement modifies the mode of operation of the circuit and permits resonance tuning to be employed regardless of the relative values of the inductor quality factors. As a result, the circuit of FIG. 7 is capable of much greater sensitivity to very small capacitance changes than is the circuit of FIG. 9. Furthermore, the circuit of FIG. 7 can achieve one, and only one, null condition. As will be shown below, this single null occurs when the capacitor of the series L-C network in the right arm is tuned to resonate this network at nearly the same frequency as that of the series L-C network in the left arm. Although maximum null sensitivity will occur when this resonance frequency is also the operating frequency, it need not be such in order to achieve null output.

The mode of operation of the measuring circuit of the present invention can be understood by referring again to FIG. 7. The dc resistance of the entire closed path through the meter is very small compared with the reactance of choke coil 130. As a first approximation therefore, one can idealize this circuit by neglecting the dc resistance of inductors 121, 122 and 130; by neglecting the dc resistance of meter 30; by neglecting the resistance of diodes 128 and 129; and by replacing the rf generator and coupling network with a zero impedance voltage source. In the idealized circuit, no dc voltage can appear across the inductors, the meter, or the generator; hence there can likewise be no dc voltage across either diode 128 or 129. If either diode 128 or 129 were to become reverse biased during any portion of the cycle, that diode would become open-circuited and a dc voltage would appear across it. We therefore conclude that in steady-state, both diodes are in their forward-biased or conducting condition throughout the full 360° of the operating cycle. As a consequence, the voltages at points 133 and 137 are at all times, i.e., the two L-C networks are effectively coupled together by the action of the diodes.

Figure 11:
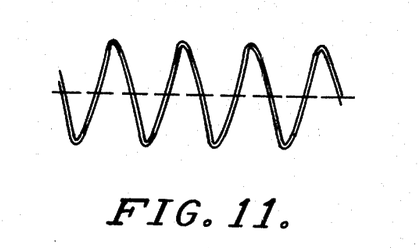
FIG. 11 is a dual-trace oscilloscope wave form of the time-varying voltages at points 133 and 137 of FIG. 7 under balance conditions.
Figure 12:
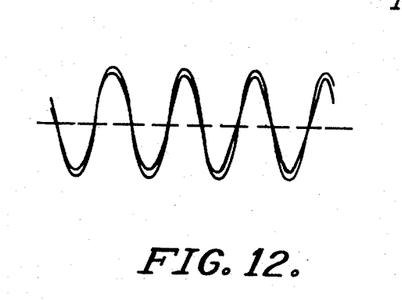
FIG. 12 is a dual-trace oscilloscope wave form of the time-varying voltages at points 133 and 137 of FIG. 7 under unbalanced conditions.

With non-ideal elements (i.e. elements containing resistance), the above conclusions are modified only slightly. In particular, the diodes will become very slightly reverse biased during a small fraction of the cycle (less than 1 degree) to replace the energy dissipated in the resistances during the remainder of the cycle. Further, if the circuit is far from balance, the voltages at points 133 and 137 will differ slightly due to the small forward voltage drop (less than 1.2 volts) across the two diodes. FIGS. 11 and 12 show dual-trace oscilloscope displays of the voltages at points 133 and 137 superimposed on the same axis. The amplitudes of these wave forms are about 25 volts peak to peak. In FIG. 11, the circuit is balanced and one notes that the two voltages are identical. In FIG. 12, the circuit is grossly unbalanced and the voltages are seen to differ slightly due to the diode voltage drops. The action of the diodes in coupling the two L-C networks together is very apparent. The mode of operation of the present circuit is clearly quite different from that of the circuit of FIG. 9 in which voltages $\hat{V}_{\circledA}$ and $\hat{V}_{\circledB}$ can vary independently.

Figure 13:
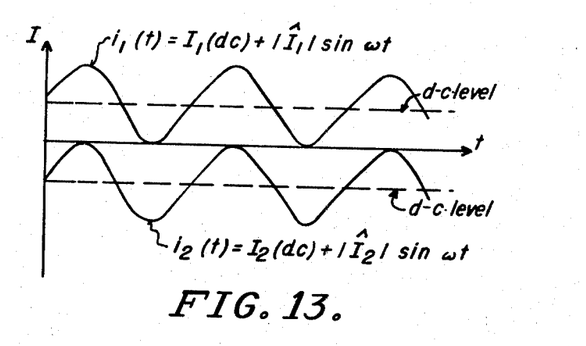
FIG. 13 is a theoretical plot of the instantaneous currents through diodes 128 and 129 of FIG. 7 as functions of time.

The instantaneous currents $i_1(t)$ and $i_2(t)$ flowing in the forward and reverse directions, respectively, of diodes 128 and 129 are shown in FIG. 13. Each diode current consists of both a dc component $I_{1,2}(dc)$ and an ac component given by the imaginary part of $\hat{I}_{1,2}e^{j\omega t}$ where $\omega = 2\pi f$ is the radian frequency. The dc component of $i_1$ is positive while that of $i_2$ is negative since the positive direction of $i_2$ is defined opposite to the forward direction of diode 129. For each diode, the total current just reaches zero at one extreme during each cycle. This is the point in time that the respective diode can become an open circuit for a tiny instant to replace energy lost during the cycle. The diode currents never pass through zero, however, because the diodes cannot conduct in their reverse directions. For each diode, the magnitudes of the dc and ac current components are seen to be very nearly equal. Thus, neglecting dc energy losses, one can write $$I_1(dc) = |\hat{I}_1| \quad (3)$$

$$I_2(dc) = -|\hat{I}_2|. \quad (4)$$

The dc meter current $I_m$ is simply the sum of the two dc diode current components. It can therefore be written in terms of the ac diode current components as $$I_m = |\hat{I}_1| - |\hat{I}_2| \quad (5)$$

As a consequence of equation (5), the techniques of ac circuit analysis can be invoked to determine the dc meter current.

Figure 14:
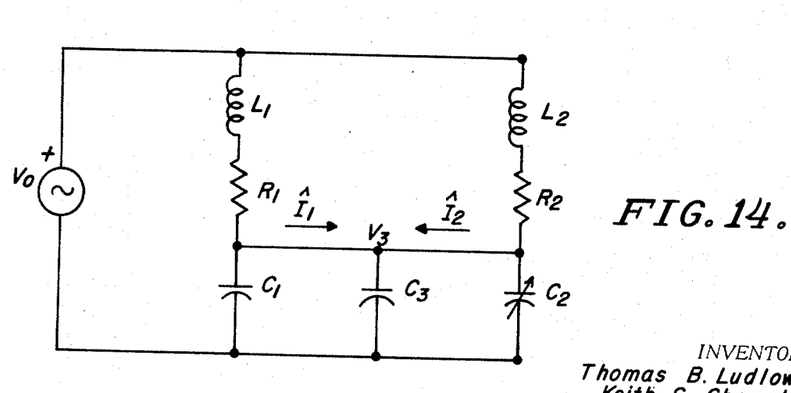
FIG. 14 is an idealized ac equivalent circuit of the comparison circuit of FIG. 7.

The ac equivalent circuit of the measuring circuit is shown in FIG. 14. Since both diodes conduct virtually continuously, they are represented as ac short circuits in FIG. 14. The two L-R networks represent the inductance and ac loss resistance of inductors 121 and 122, respectively. Capacitors $C_1$ and $C_2$ represent capacitance 35 and the parallel combination of capacitors 36 and 37, respectively. Capacitor $C_3$ represents the ac reactance of choke coil 130. In the present embodiment, this reactance is actually capacitive since the coil is operated above the frequency of self-resonance associated with its interwinding capacitance.

Assuming that the quality factors $Q_1 = \omega L_1/R_1$ and $Q_2 = \omega L_2/R_2$ are both larger than about ten; one can readily show from FIG. 14 that $|\hat{I}_1| = |\hat{I}_2|$ under the following null condition $$L_1\{C_1 + C_3/2\} = L_2\{C_2 + C_3/2\} \quad (6)$$

which is independent of $R_1$, $R_2$ and $\omega$. Furthermore, one can show that the *null sensitivity*, defined to be the rate of change of $I_m$ with respect to $C_1$ at null, reaches a maximum under the resonance condition $$\left\{\frac{L_1 L_2}{L_1 + L_2}\right\}\{C_1 + C_2 + C_3\} = 1/\omega^2. \quad (7)$$

This *resonance null sensitivity* can be further shown to be equal to $$\left.\frac{dI_m}{dC_1}\right|_{I_m=0} = |\hat{V}_0|\omega Q_T \times 10^{-6} \mu A/pF \quad (8)$$

where $$Q_T = \left\{\frac{Q_1 Q_2(L_1 + L_2)}{Q_1 L_1 + Q_2 L_2}\right\} \quad (9)$$

is the quality factor of the total circuit.

In the present embodiment of the invention, the following values apply:

$$\left.\begin{array}{c} |\hat{V}_0| \cong 1 \text{ volt} \\ f = \omega/2\pi = 5 \times 10^6 \text{ Hz} \\ Q_T \cong 25 \end{array}\right\} \quad (10)$$

Substituting these values into equation (9) yields a resonance null sensitivity of approximately 800 microamperes per picofarad. Thus, a change in the capacitance of the test cell of only ⅛ pF is sufficient to drive the 100 microampere null meter to the end of its scale. Such extreme sensitivity to minute capacitance changes is a very desirable feature in the measurement of small permittivity changes in liquids. In the present invention, such large null sensitivity is obtained by means of resonance tuning without the necessity of employing null amplification.

Consider now equations (6) and (7). In the present embodiment of the invention, $C_3$ is about ½ pF which is much less than either $C_1$ or $C_2$. The null condition, equation (6), can thus be very closely approximated by $$L_1 C_1 = L_2 C_2 \quad (11)$$

and the resonance condition, equation (7) can be closely approximated by $$\{(L_1 L_2)/(L_1 + L_2)\}\{C_1 + C_2\} = 1/\omega^2 \quad (12)$$

As discussed above, it is desirable to have balance and resonance coincide. One then obtains maximum null sensitivity. Under these conditions, equations (11) and (12) can be combined to yield $$L_1 C_1 = L_2 C_2 = 1/\omega^2 \tag{13}$$

The physical significance of these equations is the following: Null occurs when the two series L-C circuits resonate at the same frequency according to equation (11). In general, this resonant frequency need not be the operating frequency. In order to obtain maximum null sensitivity, however, the resonance frequency of each L-C circuit at null should also be equal to the operating frequency $\omega$ according to equation (13).

In practice, it is possible to maintain this resonance condition quite well over the full range of measurements encountered in the field if the range of permittivity of the test samples is not too large. This is the case, e.g., in testing lubricating oils. The measuring circuit is initially brought into resonance with the nominal value of cell capacitance as follows: A standard liquid whose permittivity is approximately in the middle of the testing range is placed in the test cell, and an oscilloscope is placed across the rf generator output (conductors 110 and 111 in FIG. 7). While observing both the oscilloscope wave form and the null meter reading, the inductance of inductor 121 and the capacitance of capacitor 36 are varied. In the present embodiment, inductor 121 is slug-tuned by means of an adjustment screw. The purpose of the above two adjustments is to obtain both a minimum fundamental frequency signal on the oscilloscope (indicating series resonance) and a null reading on the meter (indicating balance). When both conditions are observed simultaneously, equation (13) has been satisfied. The slug of inductor 121 is then locked into position and is adjusted no further. Capacitor 36 will be adjusted still further, however, as discussed below. The series resonant L-C circuits effectively extract the 5MHz fundamental frequency component from the square wave rf generator output.

The two remaining initial adjustments of the device are the inductance of inductor 122 and the capacitance of capacitor 36. These adjustments provide electrical means for setting both the scale factor and the zero point, respectively, of the deviation dial scale attached to capacitor 37. Let $L_1$ and $L_2$ be the inductance of inductors 121 and 122, respectively. Further, let $C_1(o)$ be the minimum capcitance of the test cell 35 and $C_1(o) + \delta C_1$ be its maximum capacitance. Let also $C_2$ be the capacitance of capacitor 36, $C_2'(o)$ be the capacitance of capacitor 37 at its minimum dial setting and $C_2'(0) + \delta C_2'$ be its capacitance at its maximum dial setting. From equation 11, one can write the minimum capacitance balance condition:

$$L_1 C_1(0) = L_2 \{C_2 + C_2'(0)\} \tag{14}$$

and the maximum capacitance balance condition:

$$L_1 \{C_1(0) + \delta C_1\} = L_2 \{C_2 + C_2'(0) + \delta C_2\} \tag{15}$$

subtracting equation (14) from equation (15) yields $$\delta C_2 = (L_1/L_2) \delta C_1 \tag{16}$$

Equation (16) states that the "scale factor" relating the range of the dial setting of capacitor 37 to the range of permittivity deviation of test liquids is proportional to $(L_1/L_2)$. Since $L_1$ has been already determined, $L_2$ is now chosen to obtain the desired scale factor. Once this has been done, the slug of inductor 122 is locked into position. Inductor 122 need be adjusted no further.

The only remaining adjustment is the capacitance of capacitor 36, $C_2$. According to equation (14) this capacitor sets the "zero point" of the deviation dial $C_2'(0)$ to coincide with the minimum test cell capacitance $C_1(0)$. In the present embodiment, capacitor 36 is adjusted by means of a screwdriver from the front panel. Although this adjustment is made initially at the factory, it may be infrequently repeated in the field to allow for minor variations in the zero-point permittivity of samples having slightly differing chemical compositons. In making this adjustment, one first places a standard sample liquid (such as unused lubricating oil) in the test cell and sets the deviation-scale of capacitor 37 to zero. Null is obtained by adjusting capacitor 36. Capacitor 36 is then locked in position. Thereafter, with a test sample in the test cell, the null position of capacitor 37 will indicate the increase in permittivity of the test sample with respect to the standard sample.

In our improved liquid testing device, we have provided an instrument with a simplified electrical circuit which permits measuring very small changes in the permittivity of an insulating liquid such as, e.g., lubricating oil. In the case of lubricating oil, small increases in permittivity are directly related to the amount of oxidation and contamination thereof. The novel test cell design of the invention is easy to clean and yields measurements that are virtually independent of the quantity of sample liquid as long as said quantity is larger than a few drops. The simplified measuring circuit operates at resonance to obtain maximum null sensitivity and at balance (null) to free the measurements from errors due to changing battery voltage, aging of components, and other environmental factors. Electrical means are provided for initial calibration of both the zero point and the scale factor of the permittivity deviation dial scale. The simplified circuit is energized only under conditions of operation of the momentary switch during test to provide long life for the instrument.

In considering this invention, it should be remembered that the present disclosure is illustrative only and the scope of the invention should be determined by the appended claims.

What is claimed is:

1. A self-contained liquid testing device comprising: a casing; an instrument plate mounted on one side of the casing closing the same; circuit means including a battery source, oscillator means and inductance and capacitance elements connected in a comparison circuit with a micro-ammeter means detecting unbalance of said comparison circuit, at least some of the elements of the circuit means being mounted on the instrument plate and positioned within the casing; one of the capacitance elements of the comparison circuit being a liquid test cell formed by a pair of electrodes separated by insulating material positioned therebetween and positioned in the same coplanar surface to define a uniform gap between the electrodes with each of the electrodes being defined by a plurality of fingers emanating from a common conductor and uniformly spaced apart to give a constant repeat length; and a raised wall positioned around and above the electrodes of the cell and defining an area having a predetermined height into which liquid is introduced to the predetermined height to cover the electrodes, said repeat length of the electrode configuration bearing a ratio to the height of the raised wall of from 10 to 20 percent, said test cell being mounted on a board of material having a dielectric constant approximately equal to the permittivity of the liquid to be tested which dielectric constant of said material remains substantially constant with changes in temperature over the normal operating range of temperature of the liquid being tested.

2. The self-contained liquid testing device of claim 1 in which the test cell is mounted on the face of the instrument plate.

3. The self-contained liquid testing device of claim 2 in which the material upon which the electrodes of the test cell are mounted is made of a polyphenylene oxide and in which the electrodes are defined by a copper surface affixed to the polyphenylene oxide with the finger configuration etched thereon.

4. The self-contained liquid testing device of claim 3 in which the test cell includes an upwardly inclined wall surface emanating from the raised wall surrounding the electrodes which bears an angle of at least 20° to the plane of the electrodes.

5. The self-contained liquid testing device of claim 2 in which the raised wall around the electrodes defines a cup, the diameter of which bears a ratio to the length of the gap between the electrodes of from 20–30 to 1.

6. The self-contained liquid testing device of claim 5 in which the ratio of gap length to gap width varies from 3000 to 1 to 3800 to 1.

7. The self-contained liquid testing device of claim 1 in which the pair of electrodes are formed by two sets of elongated parallel spaced finger members interspaced from one another and separated by a gap with the fingers of each set being generally rectangular in configuration and connected to a common bus portion and with electrical connections extending from the electrodes at the bus portions.

8. The self-contained liquid testing device of claim 1 in which one of the pair of electrodes is defined by a centrally located bus with a plurality of fingers emanating therefrom and the other electrode is defined by a common bus substantially surrounding the same with a plurality of figures emanating therefrom and interleaved between the fingers of the centrally located bus with the overall electrode configuration being generally circular.

9. The self-contained liquid testing device of claim 1 in which the electrically insulating material positioned between the electrodes is formed of a low permittivity material having an exposed surface flush with the surface of the electrode elements.

10. The self-contained liquid testing device of claim 1 in which the electrodes of the test cell are formed from a piece of noble metal coated on insulating material, wherein the electrode gaps are formed by chemical etching techniques and where the gap spacing is filled with insulating material by forcing said insulating material into the gap under heat and pressure, so that the electrodes and the gap insulating material form a continuous flush surface.

11. The self-contained liquid testing device of claim 1 in which the comparison circuit consists of a series L-C network containing the test cell as its capacitive element and a second series L-C network containing variable capacitance; the inductors of said networks having quality factors greater than 10 at the operating frequency of the oscillator means.

12. A self-contained liquid testing device comprising: a casing, an instrument plate mounted on one side of the casing closing the same; circuit means including a battery source, oscillator means and inductance and capacitance elements connected in a comparison circuit with a micro-ammeter means detecting unbalance of said comparison circuit, at least some of the elements of the circuit means being mounted on the instrument plate and positioned within the casing; one of the capacitance elements of the comparison circuit being a liquid test cell formed by a pair of electrodes separated by insulating material positioned therebetween and positioned in the same coplaner surface to define a uniform gap between the electrodes with each of the electrodes being defined by a plurality of fingers emanating from a common conductor and uniformly spaced apart to give a constant repeat length, and a raised wall positioned around and above the electrodes of the cell and defining an area having a predetermined height into which liquid is introduced to the predetermined height to cover the electrodes, said repeat length of the electrode configuration bearing a ratio to the height of the raised wall of from 10 to 20 percent, said test cell being mounted on a board of material having a dielectric constant approximately equal to the permittivity of the liquid to be tested with dielectric constant of said material remains substantially constant with changes in temperature over the normal operating range of temperature of the liquid being tested, said comparison circuit consisting of a series L-C network containing the test cell as its capacitive element and a second series L-C network containing variable capacitance; both networks being effectively coupled together at their L-C junctions by means of a semiconductor diodes which conduct for virtually 360° and which provide means for detecting the condition of having the latter network tuned to nearly the same frequency of series resonance as the former.

13. The self-contained liquid testing device of claim 12 in which the nominal capacitance of the test cell is operated in a condition of series resonance with an inductor at the operating frequency of the oscillator means.

14. The self-contained liquid testing device of claim 13 in which the second series L-C network contains two variable capacitors in parallel with one capacitor being affixed to a dial scale read from the instrument plate and the other capacitor being adjusted to provide initial calibration of the zero point of said dial scale.

15. The self-contained liquid testing device of claim 13 and including switch means positioned between the battery source and the oscillator means to selectively energize the oscillator means and hence the measuring circuit with operation of the switch means.

16. A self-contained liquid testing device comprising: a casing; an instrument plate mounted on one side of the casing closing the same; circuit means including a battery source, oscillator means and inductance and capacitance elements connected in a comparison circuit with a micro-ammeter means detecting unbalance of said comparison circuit, at least some of the elements of the circuit means being mounted on the instrument plate and positioned within the casing; one of the capacitance elements of the comparison circuit being a liquid test cell formed by a pair of electrodes seaparated by insulating material positioned therebetween and positioned in the same coplaner surface to define a uniform gap between the electrodes with each of the electrodes being defined by a plurality of fingers emanating from a common conductor and uniformly spaced apart to give a constant repeat length; and a raised wall positioned around and above the electrodes of the cell and defining an area having a predetermined height into which liquid is introduced to the predetermined height to cover the electrodes, said repeat length of the electrode configuration bearing a ratio to the height of the raised wall of from 10 to 20 percent, said test cell being mounted on a board of material having a dielectric constant approximately equal to the permittivity of the liquid to be tested which dielectric constant of said material remains substantially constant with change in temperature over the normal operating range of temperature of the liquid being tested, said comparison circuit consisting of a series L-C network containing the test cell as its capacitive element and a second series L-C network containing variable capacitance having two semiconductor diodes connected in tandem between the common points of the L-C networks and the micro-ammeter means connected to the common point of the diodes to measure the difference between the two DC components of the diode current.

* * * * *